United States Patent
Kwon

(10) Patent No.: US 12,454,259 B2
(45) Date of Patent: Oct. 28, 2025

(54) FAILURE DETECTION METHOD OF PRESSURE REDUCING VALVE OF BRAKE SYSTEM AND BRAKE SYSTEM

(71) Applicant: HL MANDO CORPORATION, Gyeonggi-do (KR)

(72) Inventor: Yongwoo Kwon, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 33 days.

(21) Appl. No.: 18/233,328

(22) Filed: Aug. 14, 2023

(65) Prior Publication Data

US 2024/0336247 A1     Oct. 10, 2024

(30) Foreign Application Priority Data

Apr. 10, 2023   (KR) .................. 10-2023-0046600

(51) Int. Cl.
*B60T 17/22*     (2006.01)
*B60T 13/66*     (2006.01)

(52) U.S. Cl.
CPC .......... *B60T 17/221* (2013.01); *B60T 13/662* (2013.01)

(58) Field of Classification Search
CPC ...... B60T 17/221; B60T 13/662; B60T 7/042; B60T 13/146; B60T 13/686; B60T 17/22; B60T 13/12; B60T 2270/406; B60Y 2306/15; B60Y 2400/81
See application file for complete search history.

(56) References Cited

U.S. PATENT DOCUMENTS

| | | | |
|---|---|---|---|
| 2017/0217415 A1* | 8/2017 | Kim ...................... | B60T 13/146 |
| 2019/0210581 A1* | 7/2019 | Saito ..................... | B60T 13/686 |
| 2021/0114577 A1* | 4/2021 | Kashiwagi ............. | B60T 7/042 |
| 2022/0055582 A1* | 2/2022 | Takimoto ............. | G01R 33/072 |

* cited by examiner

*Primary Examiner* — Sizo B Vilakazi
(74) *Attorney, Agent, or Firm* — WOMBLE BOND DICKINSON (US) LLP

(57) ABSTRACT

Disclosed is a failure detection method of a pressure reducing valve of a brake system. The failure detection method of a pressure reducing valve of a brake system includes: moving, when performing a pressure reducing operation of a brake system, a pump piston by controlling a motor of the brake system; calculating a circuit pressure change amount of the brake system in response to the performing of the pressure reducing operation; and determining that a failure occurs in a pressure reducing valve of the brake system when the circuit pressure change amount does not correspond to a predetermined range.

20 Claims, 11 Drawing Sheets

FAILURE DETECTION METHOD OF PRESSURE REDUCING VALVE OF BRAKE SYSTEM AND BRAKE SYSTEM

CROSS-REFERENCE TO RELATED APPLICATION

This application claims priority under 35 U.S.C. § 119 to Korean Patent Application No. 10-2023-0046600, filed on Apr. 10, 2023, in the Korean Intellectual Property Office (KIPO), the disclosure of which is incorporated by reference herein in its entirety.

TECHNICAL FIELD

The present disclosure relates to a failure detection method of a pressure reducing valve of a brake system and a brake system, and particularly, to a failure detection method of a pressure reducing valve of a brake system for specifying a pressure reducing valve which has a mechanical failure, and a brake system.

BACKGROUND

When a brake system (e.g., an IDB based brake system) senses a braking willingness of a driver, the brake system generates and/or releases a required braking pressure by moving a pump piston through motor driving. For example, when the pump piston moves in a pressurization direction, a brake liquid in a chamber is compressed and the braking pressure is generated, and on the contrary, when the pump piston moves in a pressure reducing direction, the brake liquid is sucked into the chamber to release the pressure.

Meanwhile, when a failure in which a pressure reducing valve for opening a flow path connected to the chamber during a pressure reducing operation is mechanically stuck occurs, there is a problem in that a braking pressure is not released. However, there is a problem in that it is difficult to identify which valve among various pressure reducing valves constituting the brake system has a mechanical problem.

SUMMARY

In order to solve the problem, the present disclosure provides a failure detection method of a pressure reducing valve of a brake system, a non-transitory computer readable medium storing instructions, and a system (apparatus).

The present disclosure may be implemented by various schemes including a method, a system (apparatus), or a non-transitory computer readable medium storing instructions.

An exemplary embodiment of the present disclosure provides a failure detection method of a pressure reducing valve of a brake system, which is performed by at least one processor which includes: moving, when performing a pressure reducing operation of a brake system, a pump piston by controlling a motor of the brake system; calculating a circuit pressure change amount of the brake system in response to the performing of the pressure reducing operation; and determining that a failure occurs in a pressure reducing valve of the brake system when the circuit pressure change amount does not correspond to a predetermined range.

According to an exemplary embodiment of the present disclosure, the failure detection method further includes: determining a pressurization mode of the brake system. The determining of the failure occurring in the pressure reducing valve of the brake system includes determining that the failure occurs in a first pressure reducing valve when the determined pressurization mode is a forward pressurization mode and the circuit pressure change amount is equal to or more than a first threshold value.

According to an exemplary embodiment of the present disclosure, the failure detection method further includes: determining a pressurization mode of the brake system. The determining of the failure occurring in the pressure reducing valve of the brake system includes determining that the failure occurs in a second pressure reducing valve when the determined pressurization mode is a backward pressurization mode and an absolute value of the circuit pressure change amount is equal to or less than a second threshold value.

According to an exemplary embodiment of the present disclosure, the failure detection method further includes: determining the pressurization mode of the brake system. The determining of the failure occurring in the pressure reducing valve of the brake system includes determining that the failure occurs in a third pressure reducing valve when the determined pressurization mode is the backward pressurization mode and the circuit pressure change amount is equal to or more than a third threshold value.

According to an exemplary embodiment of the present disclosure, the failure detection method further includes: calculating a position change amount of the pump piston in response to the performing of the pressure reducing operation. The determining of the failure occurring in the pressure reducing valve of the brake system includes determining that a failure occurs in a pressure reducing valve of the brake system when the circuit pressure change amount according to the position change amount of the pump piston does not correspond to a predetermined range.

According to an exemplary embodiment of the present disclosure, the failure detection method further includes: calculating a target braking pressure of a driver and a circuit pressure of the brake system in response to the performing of the pressure reducing operation; and calculating a pressure error value indicating a difference between the calculated target braking pressure and the circuit pressure. The calculating of the circuit pressure change amount of the brake system includes calculating the circuit pressure change amount of the brake system when the calculated pressure error value is equal to or more than a first reference.

According to an exemplary embodiment of the present disclosure, the calculating of the circuit pressure change amount of the brake system when the calculated pressure error value is equal to or more than the first reference includes recording a circuit pressure at a first time when the calculated pressure error value is equal to or more than the first reference, and calculating the circuit pressure change amount of the brake system based on the recorded circuit pressure at the first time.

According to an exemplary embodiment of the present disclosure, the failure detection method further includes: calculating a change amount of the pressure error value indicating the difference between the target braking pressure and the circuit pressure. The calculating of the circuit pressure change amount of the brake system includes calculating the circuit pressure change amount of the brake system when the calculated pressure error value is equal to or more than the first reference and the calculated change amount of the pressure error value is equal to or more than a second reference for a predetermined time.

According to an exemplary embodiment of the present disclosure, the pressure reducing valve is a normal close (NC) valve which is opening/closing-controllable.

According to an exemplary embodiment of the present disclosure, the failure detection method further includes: switching the pressurization mode so as not to use a pressure reducing valve in which the failure occurs when determined the failure occurs in the pressure reducing valve of the brake system.

According to an exemplary embodiment of the present disclosure, the determining of the failure occurring in the pressure reducing valve of the brake system includes determining that a mechanical stuck occurs in the pressure reducing valve.

According to an exemplary embodiment of the present disclosure, the moving of the pump piston by controlling the motor of the brake system includes moving the pump piston in a backward direction when the pressurization mode is the forward pressurization mode, and moving the pump piston in a forward direction when the pressurization mode is the backward pressurization mode.

Another exemplary embodiment of the present disclosure provides a failure detection method of a pressure reducing valve of a brake system performed by at least one processor which includes: determining a pressurization mode of the brake system; determining a pressure reducing direction of a pump piston performing a pressure reducing operation of the brake system, and calculating a position change amount of the pump piston; calculating a circuit pressure change amount of the brake system; and detecting a failure of one of a first pressure reducing valve, a second pressure reducing valve, and a third pressure reducing valve associated with the brake system based on the determined pressurization mode, pressure reducing direction of the pump piston, position change amount of the pump piston, and the circuit pressure change amount.

According to an exemplary embodiment of the present disclosure, the detecting of the failure of one of the first pressure reducing valve, the second pressure reducing valve, and the third pressure reducing valve associated with the brake system includes detecting the failure of the first pressure reducing valve when the determined pressurization mode is a forward pressurization mode, a pressure reducing direction of the pump piston is a backward direction, a position change amount of the pump piston is equal to or more than a predetermined reference, and the circuit pressure change amount is equal to or more than a first threshold value.

According to an exemplary embodiment of the present disclosure, the detecting of the failure of one of the first pressure reducing valve, the second pressure reducing valve, and the third pressure reducing valve associated with the brake system includes detecting the failure of the second pressure reducing valve when the determined pressurization mode is a backward pressurization mode, the pressure reducing direction of the pump piston is a forward direction, the position change amount of the pump piston is equal to or more than the predetermined reference, and an absolute value of the circuit pressure change amount is equal to or less than a second threshold value.

According to an exemplary embodiment of the present disclosure, the detecting of the failure of one of the first pressure reducing valve, the second pressure reducing valve, and the third pressure reducing valve associated with the brake system includes detecting, the failure of the third pressure reducing valve when the determined pressurization mode is the backward pressurization mode, the pressure reducing direction of the pump piston is the forward direction, and the circuit pressure change amount is equal to or more than a third threshold value.

Yet another exemplary embodiment of the present disclosure provides a brake system which includes: a chamber storing a brake liquid; a pump piston formed to advance and retreat inside the chamber in order to generate a braking pressure; a motor connected to the pump piston, and formed to generate a power for an operation of the pump piston; a first pressure reducing valve, a second pressure reducing valve, and a third pressure reducing valve connected to the chamber, and forming a flow path of the brake liquid stored in the chamber through opening/closing; and a controller managing the braking pressure by moving the pump piston through driving of the motor, and calculating a circuit pressure change amount of the brake system to detect failures of the first pressure reducing valve, the second pressure reducing valve, and the third pressure reducing valve.

According to an exemplary embodiment of the present disclosure, the controller determines that the failure occurs in the first pressure reducing valve when a pressurization mode of the brake system is a forward pressurization mode and the circuit pressure change amount is equal to or more than a first threshold value.

According to an exemplary embodiment of the present disclosure, the controller determines that the failure occurs in the second pressure reducing valve when the pressurization mode of the brake system is a backward pressurization mode and an absolute value of the circuit pressure change amount is equal to or less than a second threshold value.

According to an exemplary embodiment of the present disclosure, the controller determines that the failure occurs in the third pressure reducing valve when the pressurization mode of the brake system is the backward pressurization mode and the circuit pressure change amount is equal to or more than a third threshold value.

According to various exemplary embodiments of the present disclosure, even when a failure occurs in a specific pressure reducing valve of a brake system, can accurately detect a pressurization valve having the failure through a pressurization mode, a circuit pressure change amount, etc., and when the failure is detected, the brake system performs degrade control of switching the pressurization mode into another pressurization mode capable of releasing pressure to guarantee a safety performance of a driver.

In various exemplary embodiments of the present disclosure, when the failure occurs in the specific pressure reducing valve, the brake system can perform pressure reduction of a hydraulic circuit by switching a pressurization mode so as not to use the pressure reducing valve in which the failure occurs for pressure reduction.

In various exemplary embodiments of the present disclosure, the brake system can effectively detect a valve which is mechanically stuck by using a pressurization mode condition and a circuit pressure change amount condition.

Advantages of the present disclosure are not limited to the aforementioned effects and other unmentioned advantages will be clearly understood by those (referred to as "normal technicians") skilled in the technical field to which the present disclosure pertains from the description of the claims.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The exemplary embodiments of the present disclosure will be described by reference to the accompanying drawings described below, where the similar reference numerals represent similar elements, but are not limited thereto.

DETAILED DESCRIPTION

Figure 1:
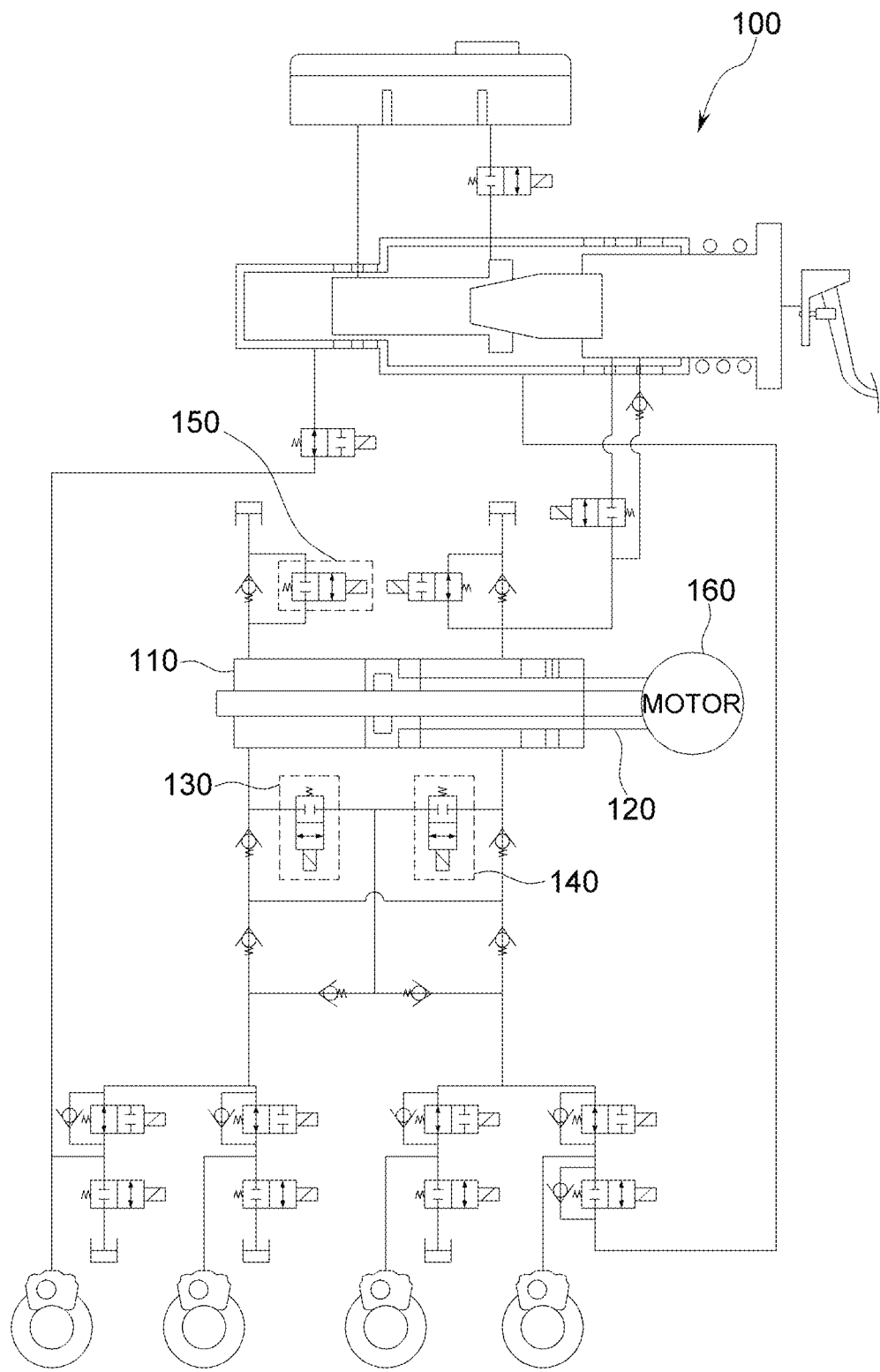
FIG. 1 is a diagram illustrating an example of a brake system according to an exemplary embodiment of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, specific contents for carrying out the present disclosure will be described in detail with reference to the accompanying drawings. However, in the following description, if the gist of the present disclosure may be unnecessarily obscure, the specific description of the well-known functions or configurations will be omitted.

In the accompanying drawings, the same or corresponding component is represented by the same reference numeral. Further, in describing the following exemplary embodiments, redundantly describing the same or corresponding component may be omitted. However, even though the description of the component is omitted, it is not intended that such a component is not included in any exemplary embodiment.

Advantages and features of the disclosed exemplary embodiment of the present disclosure, and methods for accomplishing the same will be more clearly understood from embodiments described below with reference to the accompanying drawings. However, the present disclosure is not limited to an exemplary embodiment disclosed below but may be implemented in various different shapes and the exemplary embodiments just complete the present disclosure and is provided to completely inform a scope of the present disclosure to those skilled in the art.

Terms used in the present specification will be described in brief and the disclosed exemplary embodiment will be described in detail. Terms used in the present disclosure adopt general terms which are currently widely used as possible by considering functions in the present disclosure, but the terms may be changed depending on an intention of those skilled in the art, a precedent, emergence of new technology, etc. Further, in a specific case, a term which an applicant arbitrarily selects is present and in this case, a meaning of the term will be disclosed in detail in a corresponding description part of the invention. Accordingly, the term used in the present disclosure should be defined based on not just a name of the term but a meaning of the term and contents throughout the present disclosure.

A singular expression in the present specification includes a plural expression if there is no clearly singular meaning in the context. Further, the plural expression includes the singular expression if there is no clearly plural meaning in the context. Throughout the specification, unless explicitly described to the contrary, any part including any component may mean that any part may further include another component other than the exclusion of any other component.

In the present disclosure, the terms "include", "including", etc., may indicate that features, steps, operations, elements, and/or components are present, but the terms do not exclude addition of one or more other functions, steps, operations, elements, components, and/or a combination thereof.

In the present disclosure, if a specific component is mentioned as "coupled", "combined", "connected", or "reacted" in any other component, the specific component is directly coupled, combined, and/or connected, or reacted to other components, but not limited thereto. For example, one or more intermediate components may be present between the specific component and another component. Further, in the present disclosure, "and/or" may include one or more respective items listed or at least some combinations of one or more items.

In the present disclosure, the terms "first," "second," and the like are used to differentiate one component from other components, but the component is not limited to the term. For example, the "first" component may be the same or similar element as the "second" component.

In the present disclosure, a "brake system" may refer to a system for performing the braking of the vehicle based on a braking willingness of a driver, and may include, for example, an integrated dynamic brake 2 system (IDB2 System). Here, the integrated brake system may refer to a system that integrates a master booster and an electronic stability control (ESC). For example, the integrated brake system may include a pressure generation device that outputs an operation of a brake pedal into an electric signal through a pedal displacement sensor to operate a motor, and converts a rotational force of the motor into a straight motion to generate a braking pressure, a valve block in which a plurality of valves is installed so as to control a braking operation by receiving a liquid pressure with a force generated by the pressure generation device, and an electronic control unit controlling the motor and the valves.

In the present disclosure, a "circuit pressure change amount" which represents a pressure change amount of a hydraulic circuit may represent a value acquired by subtracting a pre-captured circuit pressure from a current circuit pressure.

In the present disclosure, a "position change amount of a pump piston" which represents a position change amount of the pump piston which moves in a chamber may represent a value acquired by subtracting a pre-captured pump piston position from a current pump piston position in a forward pressurization mode, and represent a value acquired by subtracting the current pump piston position from the pre-captured pump piston position in the case of a backward pressurization mode.

In the present disclosure, a "pressure error value" may represent a difference between a target braking pressure of the driver and the circuit pressure, and a "change amount of the pressure error value" may represent a value acquired by subtracting a pre-capture pressure error from a current pressure error.

FIG. 1 is a diagram illustrating an example of a brake system 100 according to an exemplary embodiment of the present disclosure. In the illustrated example, the brake system 100 may be an IDB2 system that converts the rotational force of a motor 160 into a straight motion to generate a braking pressure. The brake system 100 may include a brake pedal that accepts a manipulation power of a driver, a brake booster that doubles a pedal effort by using a pressure difference between a vacuum pressure and an atmospheric pressure by the pedal effort of the brake pedal, a master cylinder that generates a pressure by the brake booster, and a hydraulic circuit that connects the master cylinder and a wheel cylinder provided in a wheel in order to deliver a liquid pressure.

According to an exemplary embodiment, the brake system 100 may include a chamber 110 storing a brake liquid, a pump piston 120 formed to advance and retreat inside the chamber 110 in order to generate a braking pressure, a motor 160 connected to the pump piston 120, and formed to generate a power for an operation of the pump piston 120, a first pressure reducing valve (REL1 valve) 130, a second pressure reducing valve (REL2 valve) 140, and a third pressure reducing valve (PDV1 valve) 150 connected to the chamber 110 and forming a flow path of the brake liquid stored in the chamber through opening/closing, and a controller (ECU) (not illustrated) moving the pump piston 120 by driving the motor 160 and managing the braking pressure.

According to an exemplary embodiment, the brake system 100 forms different flow paths for each pressurization mode after sensing a braking willingness of a driver, and moves the pump piston 120 by driving the motor 160 to generate and/or release the braking pressure. For example, when the pump piston 120 moves in a pressurization direction, the brake liquid in the chamber 110 is compressed to generate the braking pressure, and when the pump piston 120 moves in a pressure reducing direction, the brake liquid is introduced in the chamber 110 to release the braking pressure. In order to form a flow path for generating and/or releasing the braking pressure, the ECU may control opening/closing operations of the first pressure reducing valve 130, the second pressure reducing valve 140, and the third pressure reducing valve 150 which are normal close (NC) valves opening/closing-controllable thereby.

According to an exemplary embodiment, when the ECU of the brake system 100 performs a pressure reducing operation, the ECU may move the pump piston 120 by controlling the motor 160, and calculate the circuit pressure change amount of the brake system 100 in response to the performing of the pressure reducing operation. Then, the ECU may determine that a failure occurs in the pressure reducing valve of the brake system 100 when the circuit pressure change amount does not correspond to a predetermined range.

According to an exemplary embodiment, the ECU of the brake system 100 may determine the pressurization mode of the brake system 100, and detect whether the failure occurs in the pressure reducing valve by using the pressurization mode and the circuit pressure change amount when the pump piston moves. For example, when the pressurization mode is a forward pressurization mode and the circuit pressure change amount is equal to or more than a first threshold value (e.g., −2 bar), the ECU may determine that the failure occurs in the first pressure reducing valve 130. In another example, when the determined pressurization mode is a backward pressurization mode and an absolute value of the circuit pressure change amount is equal to or less than a second threshold value (e.g., 2 bar), the ECU may determine that the failure occurs in the second pressure reducing valve 140. In yet another example, when the determined pressurization mode is the backward pressurization mode and the circuit pressure change amount is equal to or more than a third threshold value (e.g., 5 bar), the ECU may determine that the failure occurs in the third pressure reducing valve 150.

According to an exemplary embodiment, hen it is determined that the failure occurs in a specific pressure reducing valve of the brake system, the ECU of the brake system 100 may switch the pressurization mode so as not to use the pressure reducing valve in which the failure occurs. That is, the ECU may switch the pressurization mode so as to use a flow path which does not pass through the pressure reducing valve in which the failure occurs.

By such a configuration, even when the failure occurs in the specific pressure reducing valve of the brake system 100, the brake system 100 may accurately detect the pressurization valve in which the failure occurs through the pressurization mode, the circuit pressure change amount, etc., and when the failure is detected, the brake system 100 performs degrade control of switching the pressurization mode into another pressurization mode capable of releasing pressure to guarantee a safety performance of the driver.

Figure 2:
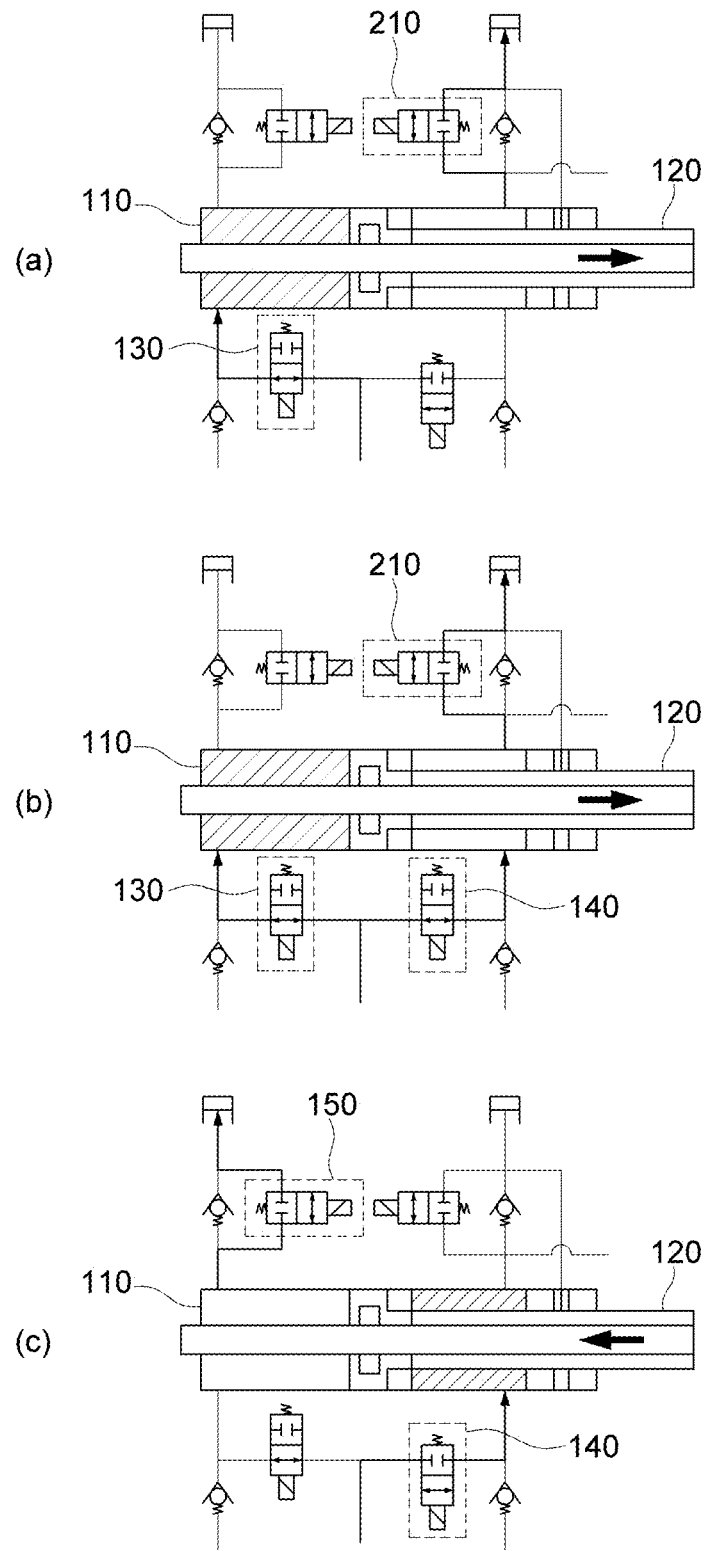
FIG. 2 is an exemplary diagram illustrating a pressure reducing operation control process of a brake system for each pressurization mode according to an exemplary embodiment of the present disclosure.

FIG. 2 is an exemplary diagram illustrating a pressure reducing operation control process of a brake system for each pressurization mode according to an exemplary embodiment of the present disclosure. According to an exemplary embodiment, the pressurization mode of the brake system may be divided into a forward mode and a backward mode according to a progress direction of a vehicle, and the forward mode may be divided into a forward low-pressure pressurization mode and a forward high-pressure pressurization mode again. Here, the forward low-pressure pressurization mode may refer to a pressurization mode to form the flow path by using the first pressure reducing valve 130, and the forward high-pressure pressurization mode may refer to a pressurization mode using the first pressure reducing valve 130 and the second pressure reducing valve 140 in order to generate a high pressure while lowering a load of the motor.

In the illustrated example, the brake system 100 of FIG. 1 may perform pressure reducing operation control differently according to a plurality of pressurization modes including the forward low-pressure pressurization mode, the forward high-pressure pressurization mode, and the backward pressurization mode. In the illustrated example, FIG. 2A illustrates a pressure reducing operation control process of the forward low-pressure pressurization mode, FIG. 2B illustrates a pressure reducing operation control process of the forward high-pressure pressurization mode, and FIG. 2C may illustrate a pressure reducing operation control process of the backward pressurization mode.

In an example of FIG. 2A, during a pressure reducing operation in the forward low-pressure pressurization mode, the pump piston 120 may move in a right direction (backward direction) by driving the motor. In this case, the first pressure reducing valve 130 is opened, so the brake liquid is introduced into a front portion of the chamber 110, thereby reducing the circuit pressure of the hydraulic circuit. Further, the brake liquid moves through a fourth pressure reducing valve 210 connected to a rear portion of the chamber 110, so a rear pressure of the chamber 110 may not increase even though the pump piston 120 moves to a right side. Here, the first pressure reducing valve 130 may be a the normal close (NC) valve which is opening/closing controllable, and the fourth pressure reducing valve 210 may be a normal open (NO) valve which is maintained in an opened state. That is, during the pressure reducing operation in the forward low-pressure pressurization mode, the first pressure reducing valve 130 and the fourth pressure reducing valve 210 are opened to perform the pressure reducing operation.

In an example of FIG. 2B, during the pressure reducing operation in the forward high-pressure pressurization mode, the pump piston 120 may move in the right direction (backward direction) by driving the motor. In this case, the first pressure reducing valve 130 and the second pressure reducing valve 140 are opened, so the brake liquid is introduced into the front portion and the rear portion of the chamber 110, thereby reducing the circuit pressure of the hydraulic circuit. Further, the brake liquid moves through the fourth pressure reducing valve 210 connected to the rear portion of the chamber 110, so the rear pressure of the chamber 110 may not increase even though the pump piston 120 moves to the right side. That is, during the pressure reducing operation in the forward high-pressure pressurization mode, the first pressure reducing valve 130, the second pressure reducing valve 140, and the fourth pressure reducing valve 210 are opened to perform the pressure reducing operation.

In an example of FIG. 2C, during a pressure reducing operation in the backward pressurization mode, the pump piston 120 may move in a left direction (forward direction) by driving the motor. In this case, the second pressure reducing valve 140 is opened, so the brake liquid is introduced into the rear portion of the chamber 110, thereby reducing the circuit pressure of the hydraulic circuit. Further, the brake liquid moves through the third pressure reducing valve 150 connected to the front portion of the chamber 110, so the front pressure of the chamber 110 may not increase even though the pump piston 120 moves to the left side. Here, the second pressure reducing valve 140 and the third pressure reducing valve 150 may be the NC valve which is opening/closing controllable. That is, during the pressure reducing operation in the backward pressurization mode, the second pressure reducing valve 140 and the third pressure reducing valve 150 are opened to perform the pressure reducing operation.

According to an exemplary embodiment, during the pressure reducing operation, when a mechanically stuck occurs in the first pressure reducing valve 130, the second pressure reducing valve 140, and/or the third pressure reducing valve 150, which are/is not opened, a flow of the flow path is limited, and pressure reduction may not be normally made. As such, when the failure occurs in the specific pressure reducing valve, the brake system may perform the pressure reduction of the hydraulic circuit by switching the pressurization mode so as not to use the pressure reducing valve in which the failure occurs for the pressure reduction.

Figure 3:
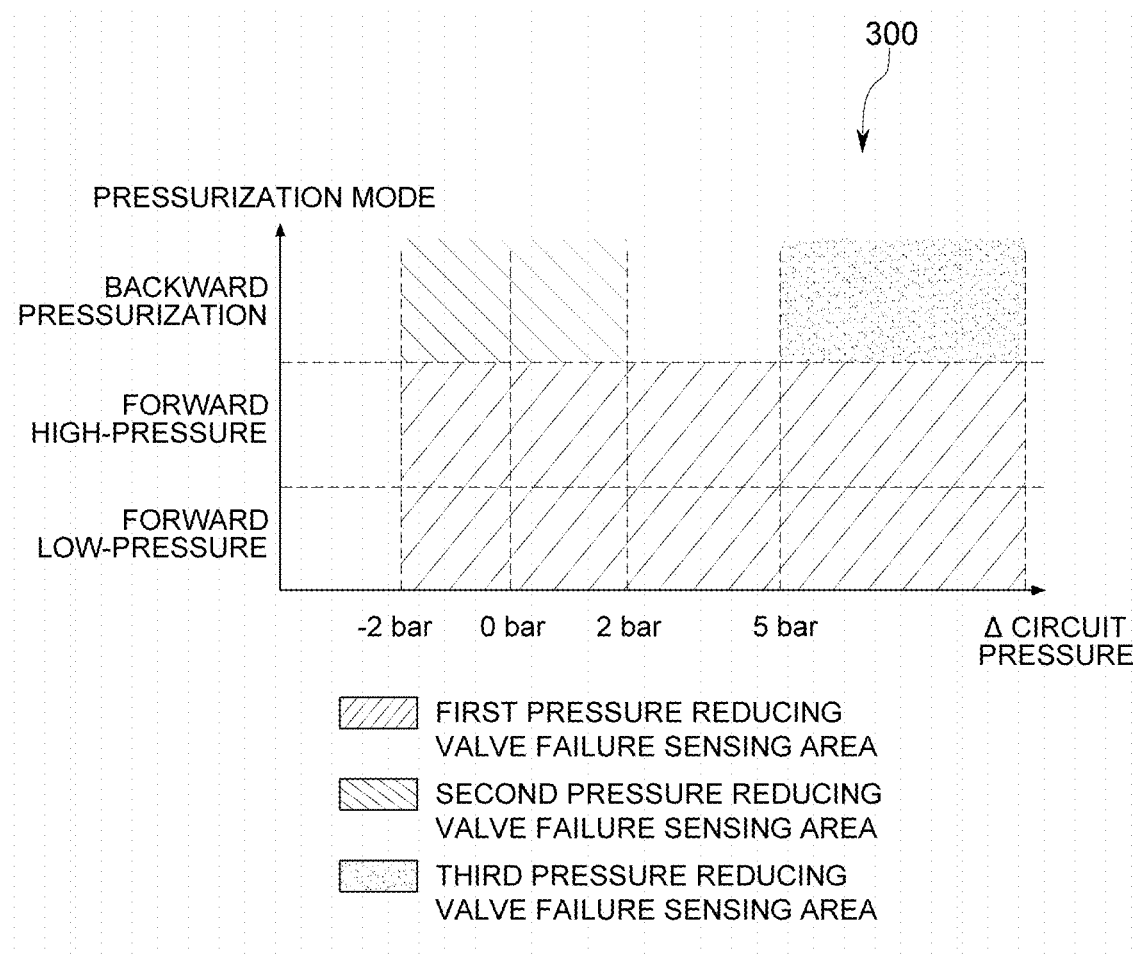
FIG. 3 is an exemplary graph illustrating failure detection areas of respective pressure reducing valves depending on a pressurization mode and a circuit pressure change amount according to an exemplary embodiment of the present disclosure.

FIG. 3 is an exemplary graph 300 illustrating failure detection areas of respective pressure reducing valves depending on a pressurization mode and a circuit pressure change amount according to an exemplary embodiment of the present disclosure. In the illustrated example, a failure detection area of the first pressure reducing valve (e.g., REL1 valve) may be an area in which the circuit pressure change amount is equal to or more than −2 bar when the pressurization mode is the forward pressurization mode (the forward high-pressure pressurization mode or the forward low-pressure pressurization mode), the failure detection area of the second pressure reducing valve (e.g., REL2 valve) may be an area in which the circuit pressure change amount is equal to or more than −2 bar and equal to or less than 2 bar when the pressurization mode is the backward pressurization mode, and the failure detection area of the third pressure reducing valve (e.g., PDV1 valve) may be an area in which the circuit pressure change amount is equal to ore more than 5 bar when the pressurization mode is the backward pressurization mode.

According to an exemplary embodiment, when the failure occurs in the first pressure reducing valve, the brake liquid is not introduced into the chamber even though the pump piston sufficiently moves to the right side in the forward pressurization mode, so the circuit pressure change amount may not be sufficiently reduced to the first threshold value (e.g., −2 bar) or less. Therefore, the brake system may determine that the failure occurs in the first pressure reducing valve when the circuit pressure change amount is equal to or more than the first threshold value in the forward pressurization mode.

In the backward pressurization mode, the failures of the second pressure reducing valve and/or the third pressure reducing valve may be detected. A range of the circuit pressure change amount for detecting the failure of the second pressure reducing valve and a range of the circuit pressure change amount for detecting the failure of the third pressure reducing valve may be determined differently. According to an exemplary embodiment, when the failure occurs in the second pressure reducing valve, the brake liquid is not introduced into the chamber even though the pump piston sufficiently moves to the left side in the backward pressurization mode, so the circuit pressure change amount may not be sufficiently reduced to a specific threshold value (e.g., −2 bar) or less. In this case, the brake system may use an absolute value of the circuit pressure change amount in order to distinguish a detection range from the third pressure reducing valve. That is, the brake system may determine that the failure occurs in the second pressure reducing valve when the absolute value of the circuit pressure change amount is equal to or less than the second threshold value in the backward pressurization mode.

According to an exemplary embodiment, when the failure occurs in the third pressure reducing valve, a front brake liquid of the chamber is compressed when the pump piston moves to the left side in the backward pressurization mode, so the circuit pressure change amount may still increase to a third threshold value or more. Therefore, the brake system may determine that the failure occurs in the third pressure reducing valve when the circuit pressure change amount is equal to or more than the third threshold value in the backward pressurization mode.

In FIG. 3, it is illustrated that the first threshold value is −2 bar, the second threshold value is 2 bar, and the third threshold value is 5 bar, but this is exemplary, and respective threshold values may be determined differently. By such a configuration, the brake system may effectively detect a valve which is mechanically stuck by using a pressurization mode condition and a circuit pressure change amount condition.

Figure 4:
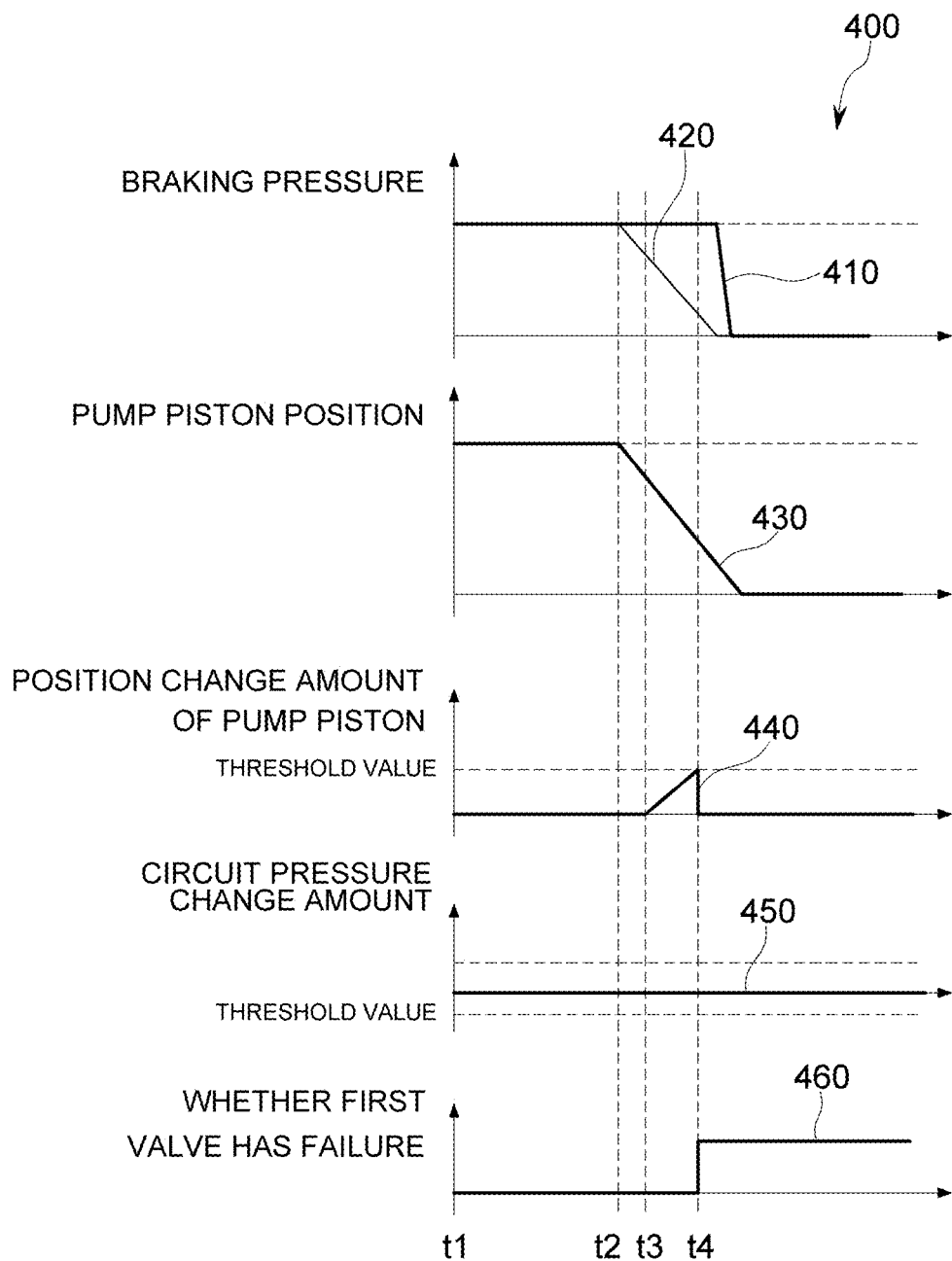
FIG. 4 is a graph illustrating a failure detection process of a first pressure reducing valve according to an exemplary embodiment of the present disclosure.

FIG. 4 is a graph 400 illustrating a failure detection process of a first pressure reducing valve according to an exemplary embodiment of the present disclosure. The graph 400 may include a graph showing a circuit pressure 410, a target braking pressure 420, a pump piston position 430, a position change amount 440 of the pump piston, a circuit pressure change amount 450, and whether the first pressure reducing valve has the failure 460 in the brake system according to a time in the forward pressurization mode. Here, a time t1 may represent a time when forward pressurization is completed, a time t2 may represent a time when the pressure reducing operation starts, a time t3 may represent a time when a pressure error value indicating a difference between the target braking pressure 420 of the driver and the circuit pressure 410 is equal to or more than a first reference, and a time t4 may represent a time when the position change amount of the pump piston exceeds a threshold value.

As illustrated, the forward pressurization of the brake system may be completed at the time t1. The circuit pressure 410, the target braking pressure 420, the pump piston position 430, the position change amount 440 of the pump piston, and the circuit pressure change amount 450 of the brake system may not be changed between the time t1 and the time t2 when the braking pressure is applied.

According to an exemplary embodiment, the pressure reducing operation of the brake system may be performed based on the pedal effort of the driver input into the brake pedal. For example, as the target braking pressure 420 is reduced and the pump piston moves in a backward direction at the time t2, the pressure reducing operation may start.

After the pressure reducing operation starts, the circuit pressure change amount 450 of the brake system may be calculated in order to detect the failure of the first pressure reducing valve. In this case, a calculation time of the circuit pressure change amount 450 may be determined based on the pressure error value indicating the difference between the target braking pressure 420 of the driver and the circuit pressure 410. For example, when the calculated pressure error value is equal to or more than the first reference, the circuit pressure change amount 450 of the brake system may be calculated, and in the illustrated example, the circuit pressure change amount 450 may be calculated between the time t3 and the time t4. That is, the circuit pressure change amount 450 may be calculated between the time t3 when the pressure error value is equal to or more than the first reference and the time t4 when the position change amount of the pump piston exceeds the threshold value. For example, the brake system may record the circuit pressure at a first time (e.g., the time t3) when the pressure error value is equal to or more than the first reference, and calculate the circuit pressure change amount of the brake system based on the recorded circuit pressure at the first time.

According to an exemplary embodiment, the brake system may determine the pressurization mode of the brake system, and calculate the circuit pressure change amount and the position change amount of the pump piston. Then, the brake system may detect the failure of the first pressure reducing valve when the determined pressurization mode is the forward pressurization mode, the pressure reducing direction of the pump piston is the backward direction, the position change amount 440 of the pump piston is equal to or more than a predetermined reference (e.g., a threshold value) between the time t3 and the time t4, and the circuit pressure change amount is equal to or more than the first threshold value. When it is determined that the failure occurs in the first pressure reducing valve, a value of a flag graph indicating whether the first pressure reducing valve has the failure (460) may be changed at the time t4.

Figure 5:
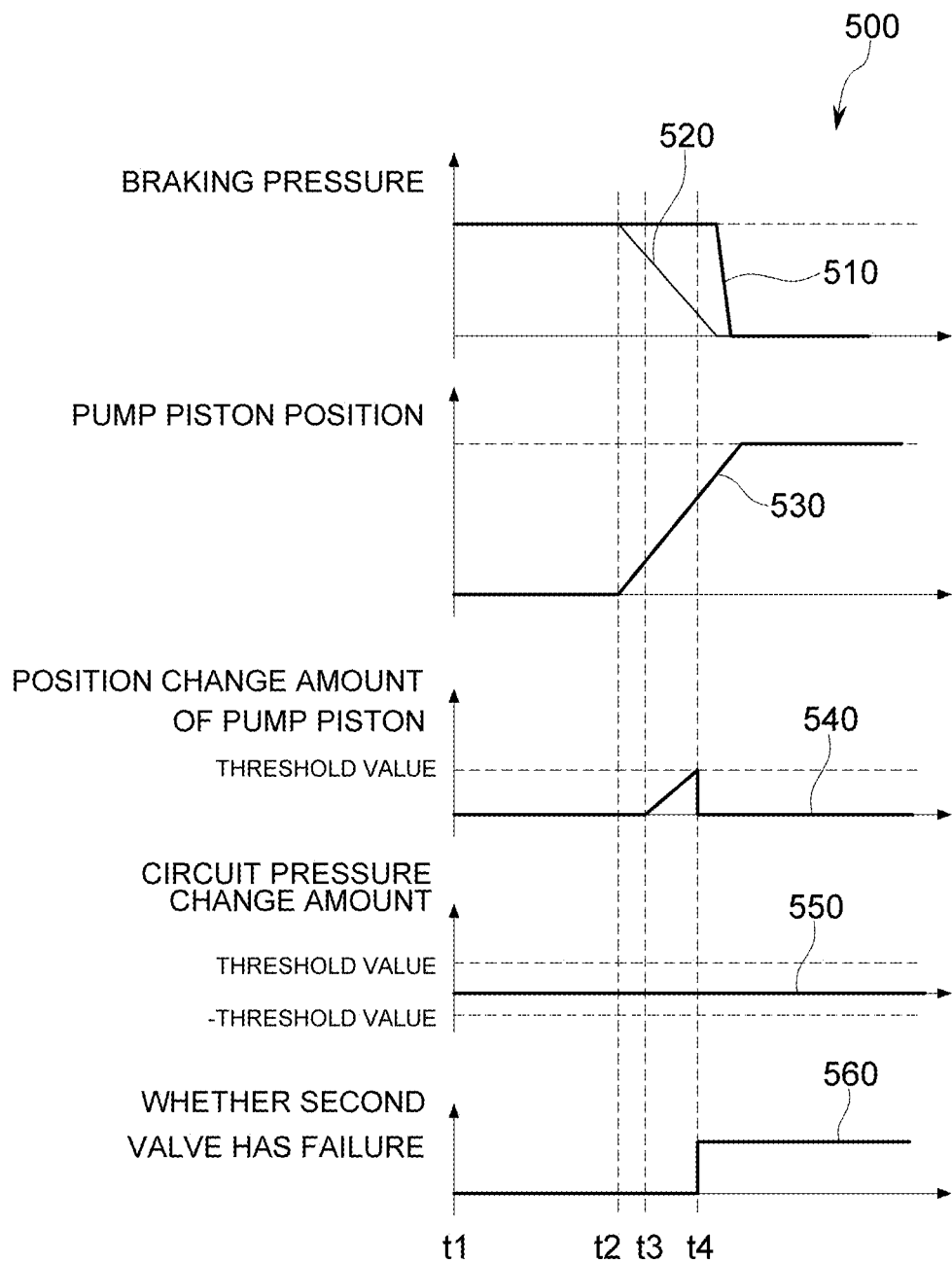
FIG. 5 is a graph illustrating a failure detection process of a second pressure reducing valve according to an exemplary embodiment of the present disclosure.

FIG. 5 is a graph 500 illustrating a failure detection process of a second pressure reducing valve according to an exemplary embodiment of the present disclosure. The graph 500 may include a graph showing a circuit pressure 510, a target braking pressure 520, a pump piston position 530, a position change amount 540 of the pump piston, a circuit pressure change amount 550, and whether the second pressure reducing valve has the failure 560 in the brake system according to a time in the backward pressurization mode. Here, a time t1 may represent a time when backward pressurization is completed, a time t2 may represent a time when the pressure reducing operation starts, a time t3 may represent a time when a pressure error value indicating a difference between the target braking pressure 520 of the driver and the circuit pressure 510 is equal to or more than a first reference, and a time t4 may represent a time when the position change amount of the pump piston exceeds a threshold value.

As illustrated, the backward pressurization of the brake system may be completed at the time t1. The circuit pressure 510, the target braking pressure 520, the pump piston position 530, the position change amount 540 of the pump piston, and the circuit pressure change amount 550 of the brake system may not be changed between the time t1 and the time t2 when the braking pressure is applied.

According to an exemplary embodiment, the pressure reducing operation of the brake system may be performed based on the pedal effort of the driver input into the brake pedal. For example, as the target braking pressure 520 is reduced and the pump piston moves in a backward direction at the time t2, the pressure reducing operation may start.

After the pressure reducing operation starts, the circuit pressure change amount 550 of the brake system may be calculated in order to detect the failure of the second pressure reducing valve. In this case, a calculation time of the circuit pressure change amount 550 may be determined based on the pressure error value indicating the difference between the target braking pressure 520 of the driver and the circuit pressure 510. For example, the circuit pressure change amount 550 may be calculated between the time t3 when the pressure error value is equal to or more than the first reference and the time t4 when the position change amount of the pump piston exceeds the threshold value.

According to an exemplary embodiment, the brake system may determine the pressurization mode of the brake system, and calculate the circuit pressure change amount and the position change amount of the pump piston. Then, the brake system may detect the failure of the second pressure reducing valve when the determined pressurization mode is the backward pressurization mode, the pressure reducing direction of the pump piston is the forward direction, the position change amount 540 of the pump piston is equal to or more than a predetermined reference (e.g., a threshold value) between the time t3 and the time t4, and an absolute value of the circuit pressure change amount is equal to or less than the second threshold value. When it is determined that the failure occurs in the second pressure reducing valve, a value of a flag graph indicating whether the second pressure reducing valve has the failure '560'? may be changed at the time t4.

Figure 6:
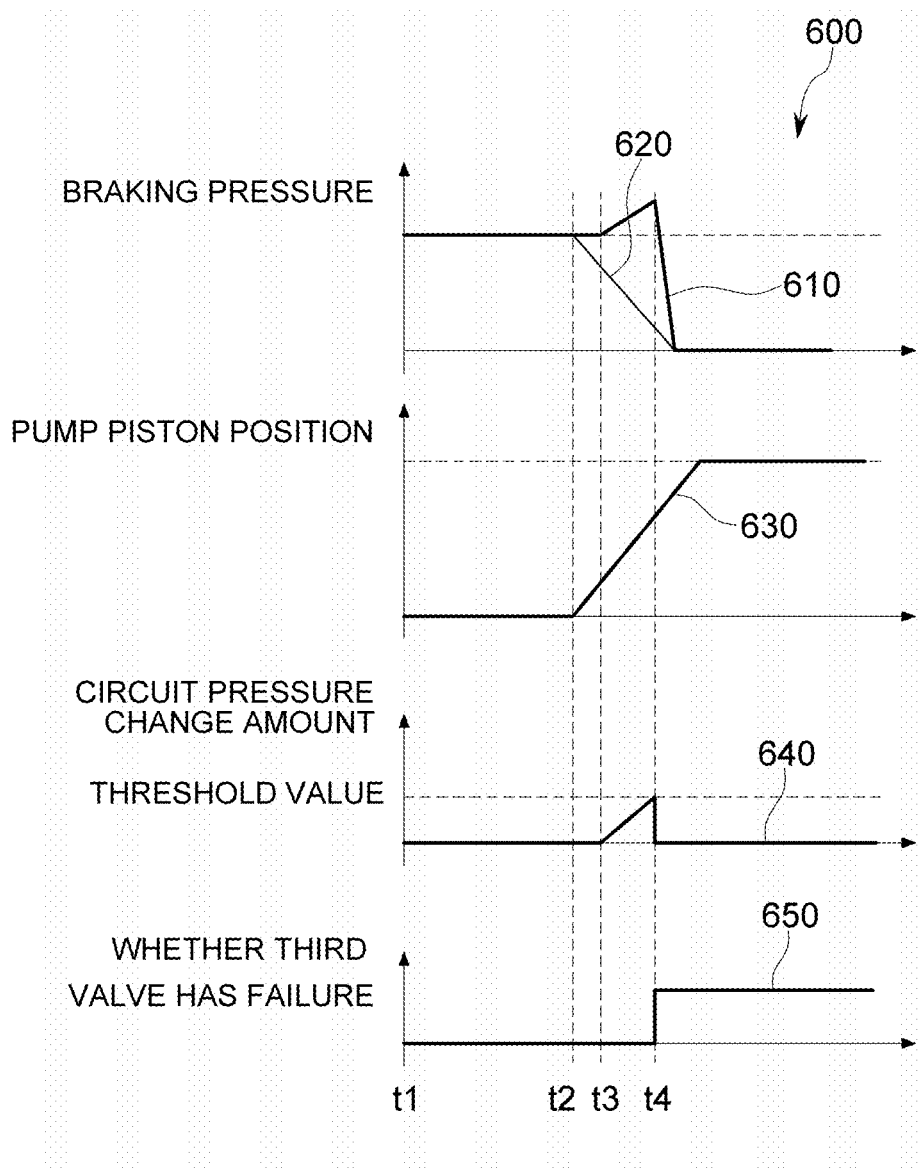
FIG. 6 is a graph illustrating a failure detection process of a third pressure reducing valve according to an exemplary embodiment of the present disclosure.

FIG. 6 is a graph 600 illustrating a failure detection process of a third pressure reducing valve according to an exemplary embodiment of the present disclosure. The graph 600 may include a graph showing a circuit pressure 610, a target braking pressure 620, a pump piston position 630, a circuit pressure change amount 640, and whether the third pressure reducing valve has the failure 650 in the brake system according to the time in the backward pressurization mode. Here, a time t1 may represent a time when backward pressurization is completed, a time t2 may represent a time when the pressure reducing operation starts, a time t3 may represent a time when a pressure error value indicating a difference between the target braking pressure 620 of the driver and the circuit pressure 610 is equal to or more than a first reference, and a time t4 may represent a time when the position change amount of the pump piston exceeds a threshold value.

As illustrated, the backward pressurization of the brake system may be completed at the time t1. The circuit pressure 610, the target braking pressure 620, the pump piston position 630, and the circuit pressure change amount 640 of the brake system may not be changed between the time t1 and the time t2 when the braking pressure is applied. Then, the circuit pressure change amount 640 may be calculated between the time t3 when the pressure error value is equal to or more than the first reference and the time t4 when the position change amount of the pump piston exceeds the threshold value. Here, the circuit pressure change amount 640 may be calculated similarly as in FIGS. 4 and 5 described above.

According to an exemplary embodiment, the brake system may determine the pressurization mode of the brake system, and calculate the circuit pressure change amount. Then, when the determined pressurization mode is the backward pressurization mode, the pressure reducing direction of the pump piston is the forward direction, and the circuit pressure change amount is equal to or more than the third threshold value, the brake system may detect the failure of the third pressure reducing valve. When it is determined that the failure occurs in the third pressure reducing valve, a value of a flag graph indicating whether the third pressure reducing valve has the failure 650 may be changed at the time t4.

Figure 7:
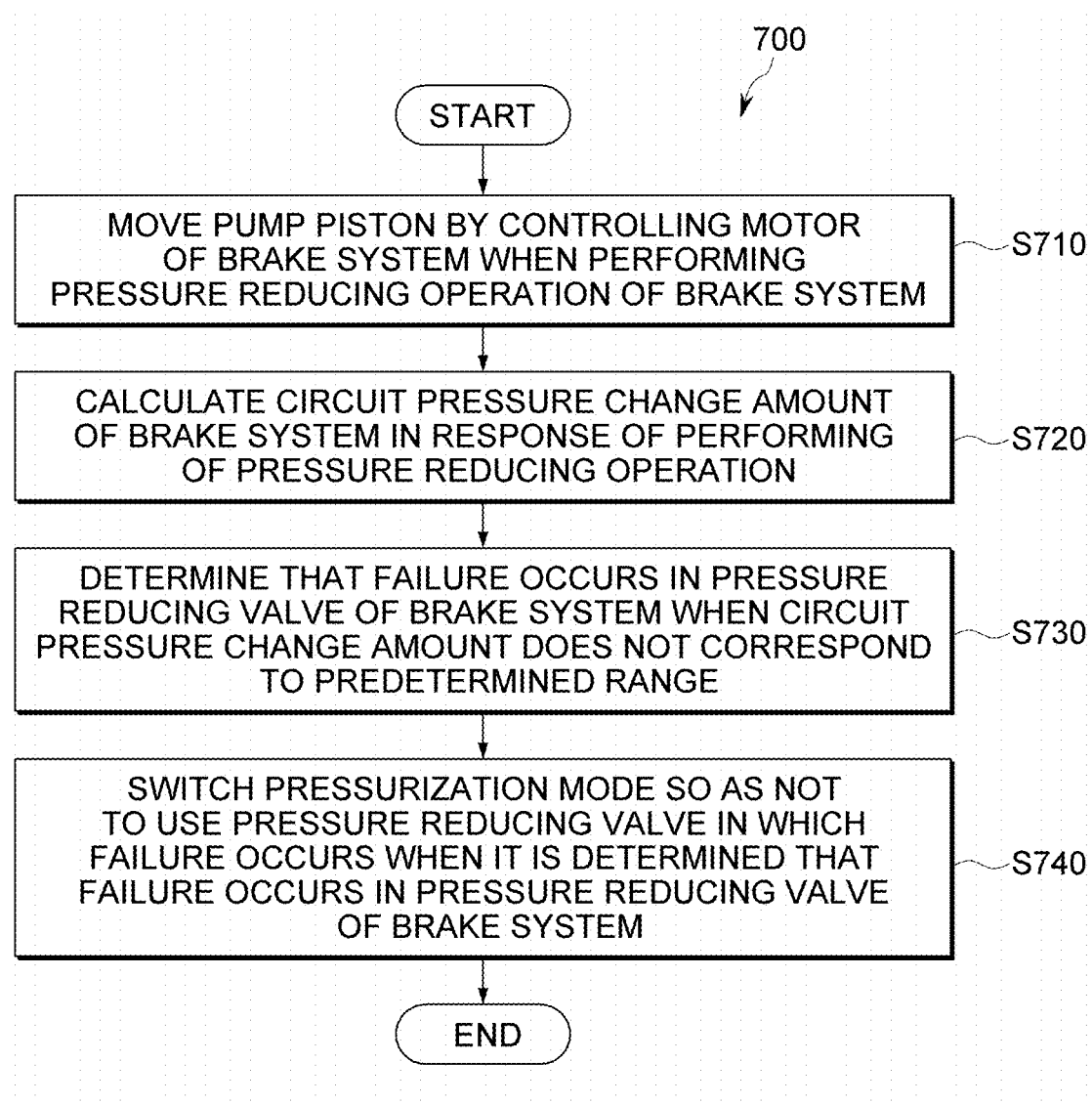
FIG. 7 is a diagram illustrating an example of a failure detection method of a pressure reducing valve of a brake system according to an exemplary embodiment of the present disclosure.

FIG. 7 is a diagram illustrating an example of a failure detection method 700 of a pressure reducing valve of a brake system according to an exemplary embodiment of the present disclosure. The failure detection method 700 of the pressure reducing valve may be performed by at least one processor (e.g. at least one processor of the brake system and/or the ECU of the brake system). The failure detection method 700 of the pressure reducing valve may be initiated by moving the pump piston by controlling the motor of the brake system when the processor performs a pressure reducing operation of the brake system (S710). For example, the processor may move the pump piston in the backward direction when the pressurization mode is the forward pressurization mode, and move the pump piston in the forward direction when the pressurization mode is the backward pressurization mode.

The processor may calculate the circuit pressure change amount of the brake system in response to the performing of the pressure reducing operation (S720). For example, the circuit pressure change amount may indicate a value acquired by subtracting a pre-capture circuit pressure from a current circuit pressure. Further, the processor may determine that a failure occurs in the pressure reducing valve of the brake system when the circuit pressure change amount does not correspond to a predetermined range (S730).

Additionally, the processor may determine the pressurization mode of the brake system. Then, the processor may detect the failure of the pressure reducing valve. For example, the processor may determine that the failure occurs in the first pressure reducing valve when the determined pressurization mode is the forward pressurization mode and the circuit pressure change amount is equal to or more than the first threshold value. In another example, the processor may determine that the failure occurs in the second pressure reducing valve when the determined pressurization mode is the backward pressurization mode and an absolute value of the circuit pressure change amount is equal to or less than the second threshold value. In yet another example, the processor may determine that the failure occurs in the third pressure reducing valve when the determined pressurization mode is the backward pressurization mode and the circuit pressure change amount is equal to or more than the third threshold value. Here, the third threshold value may be larger than the second threshold value, and the second threshold value may be larger than the first threshold value. As such, when it is determined that the failure occurs in the pressure reducing valve of the brake system, the processor may switch the pressurization mode so as not to use the pressure reducing valve in which the failure occurs (S740).

Figure 8:
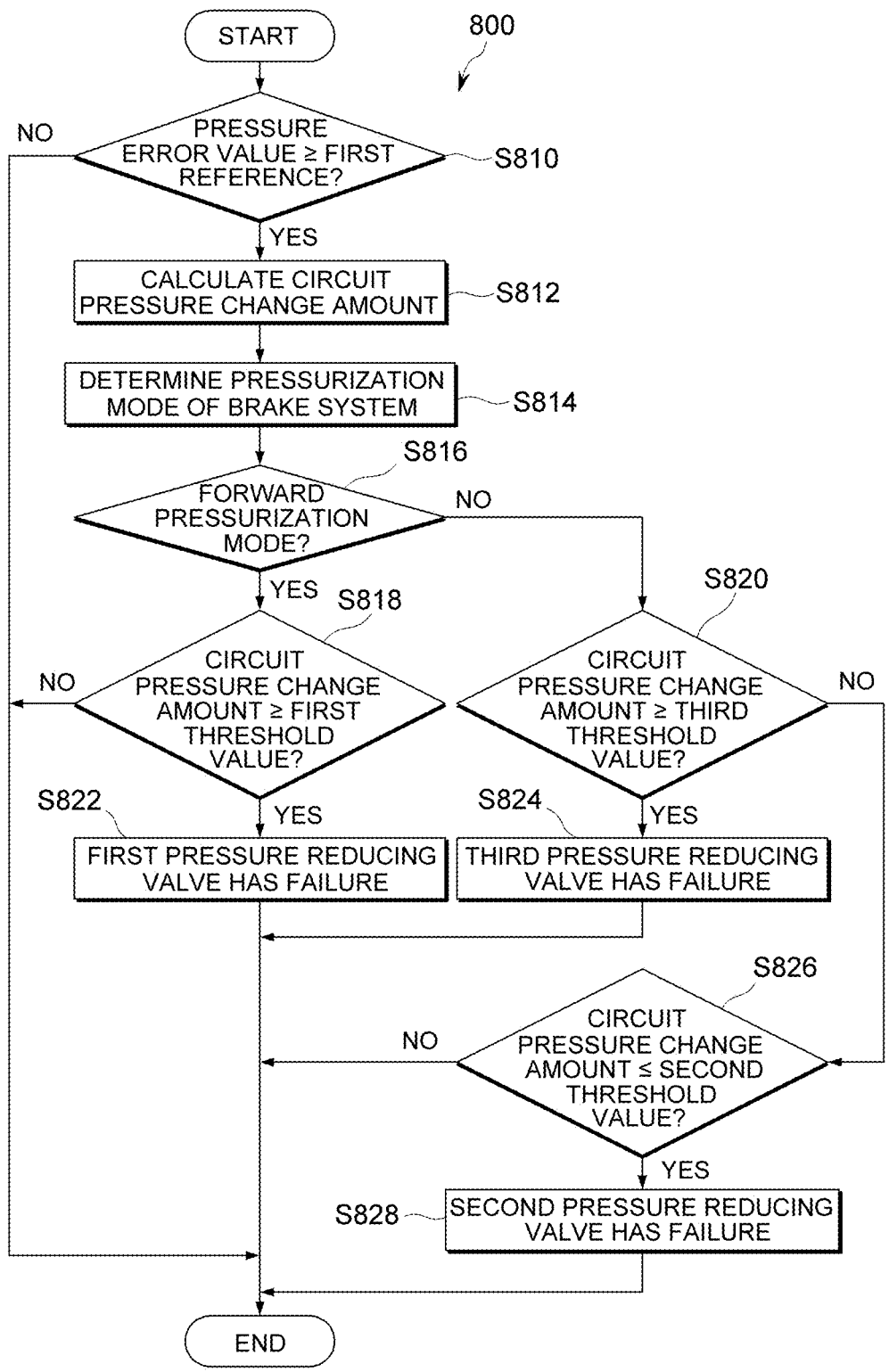
FIG. 8 is a diagram illustrating an example of a failure detection method of a pressure reducing valve based on a circuit pressure change amount according to the present disclosure.

FIG. 8 is a diagram illustrating an example of a failure detection method 800 of a pressure reducing valve based on a circuit pressure change amount according to the present disclosure. The failure detection method 800 of the pressure reducing valve may be performed by at least one processor (e.g. at least one processor of the brake system and/or the ECU of the brake system). As described above, when the processor performs the pressure reducing operation of the brake system, the processor may move the pump piston by controlling the motor of the brake system, and calculate the circuit pressure change amount of the brake system in response to the performing of the pressure reducing operation.

The processor may calculate the target braking pressure of the driver and the circuit pressure of the brake system in response to the performing of the pressure reducing operation, and calculate the pressure error value indicating the difference between the calculated target braking pressure and the circuit pressure. In this case, the processor may judge whether the calculated pressure error value is equal to or more than a first reference (S810). Further, the processor may calculate the circuit pressure change amount of the brake system when the pressure error value is equal to or more than the first reference (S812). That is, since continuously calculating the circuit pressure change amount may cause deterioration of a computing performance, the processor may calculate the circuit pressure change amount only when the pressure error value is equal to or more than a specific reference.

The processor may determine the pressurization mode of the brake system (S814). For example, since a different pressure reducing valve is used for each pressurization mode of the brake system, the processor may determine the pressurization mode, and then use the determined pressurization mode for detecting the failure of the pressure reducing valve. According to an exemplary embodiment, the processor may identify whether the determined pressurization mode is the forward pressurization mode (S816). When the pressurization mode is the forward pressurization mode, the processor may judge whether the circuit pressure change amount is equal to or more than a first threshold value (S818). When the circuit pressure change amount is equal to or more than the first threshold value, the processor may judge that a failure occurs in a first pressure reducing valve (S822).

When the pressurization mode is the backward pressurization mode other than the forward pressurization mode, the processor may judge whether the circuit pressure change amount is equal to or more than a third threshold value (S820). When the circuit pressure change amount is equal to or more than the third threshold value, the processor may judge that the failure occurs in a third pressure reducing valve (S824). Additionally, when the circuit pressure change amount is less than the third threshold value, the processor may judge whether an absolute value of the circuit pressure change amount is equal to or less than a second threshold value (S826). When the absolute value of the circuit pressure change amount is equal to or less than the second threshold value, the processor may judge that the failure occurs in a second pressure reducing valve (S828).

Figure 9:
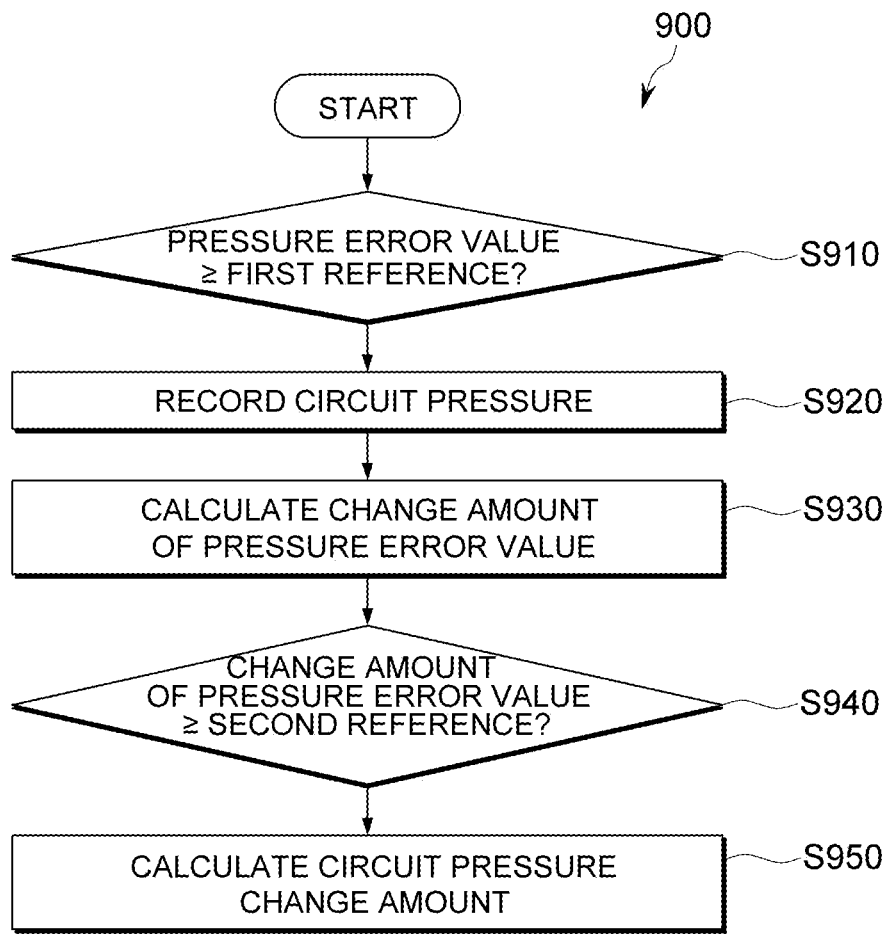
FIG. 9 is a diagram illustrating an example of a circuit pressure change amount calculation method depending on a change amount of a pressure error value according to an exemplary embodiment of the present disclosure.

FIG. 9 is a diagram illustrating an example of a circuit pressure change amount calculation method 900 depending on a change amount of a pressure error value according to an exemplary embodiment of the present disclosure. The circuit pressure change amount calculation method 900 may be performed by at least one processor (e.g. at least one processor of the brake system and/or the ECU of the brake system). As described above, when the processor performs the pressure reducing operation of the brake system, the processor may move the pump piston by controlling the motor of the brake system, and calculate the circuit pressure change amount of the brake system in response to the performing of the pressure reducing operation.

The processor may calculate the target braking pressure of the driver and the circuit pressure of the brake system in response to the performing of the pressure reducing operation, and calculate the pressure error value indicting the difference between the calculated target braking pressure and the circuit pressure. In this case, the processor may judge whether the calculated pressure error value is equal to or more than a first reference (910). In this case, the processor may record a circuit pressure at the first time when the calculated pressure error value is equal to or more than the first reference (920).

According to an exemplary embodiment, the processor may calculate a change amount of the pressure error value indicting the difference between the target braking pressure and the circuit pressure (S930). In this case, the processor may judge whether the calculated change amount of pressure error value is equal to or more than a second reference for a predetermined time (940). When it is judged that the change amount of the pressure error value is equal to or more than the second reference, the processor may calculate the circuit pressure change amount of the brake system based on the recorded circuit pressure at the first time (S950). The calculated circuit pressure change amount may be used for detecting the failure of the pressure reducing valve of the brake system.

Figure 10:
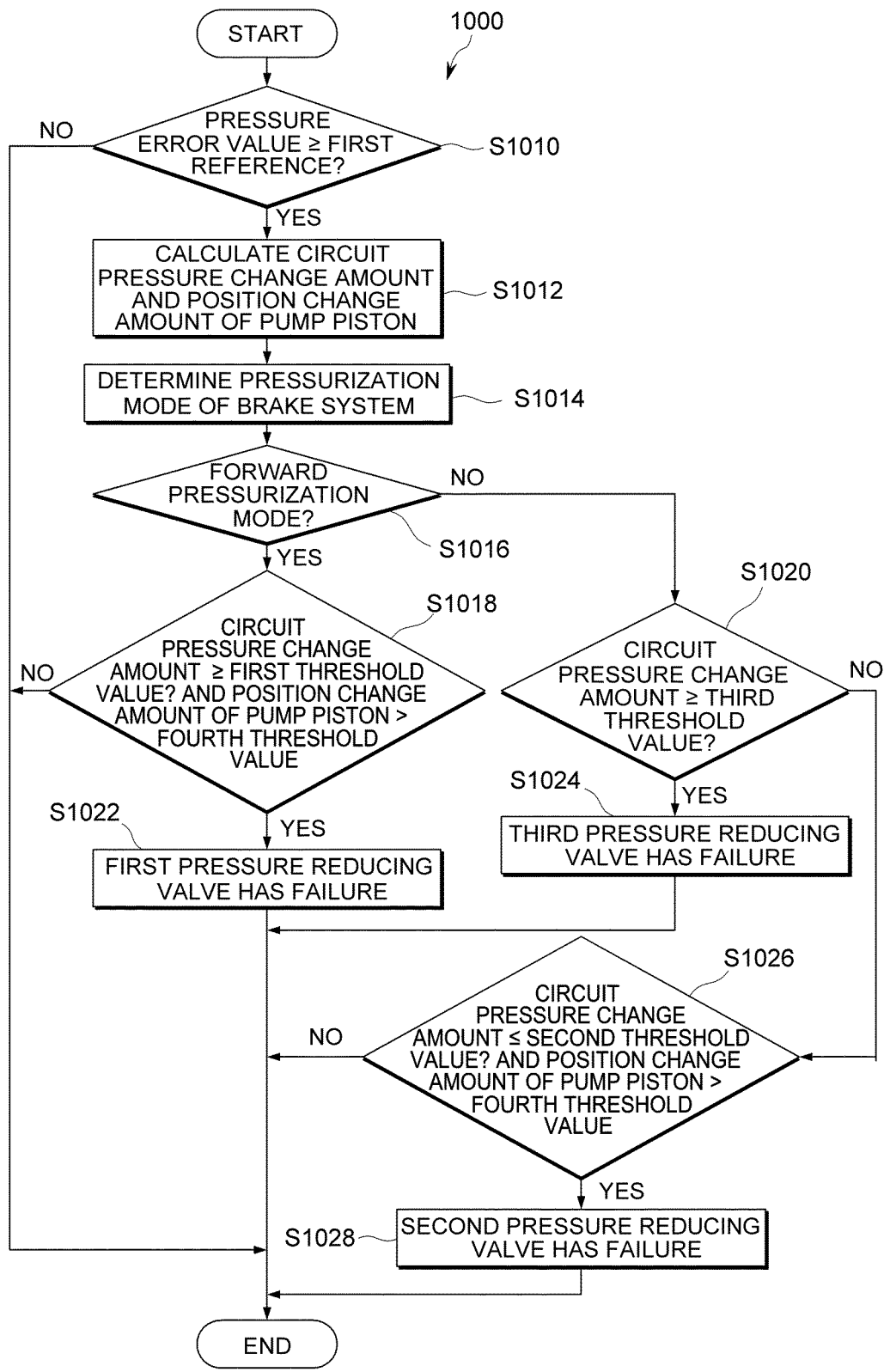
FIG. 10 is a diagram illustrating an example of a failure detection method of a pressure reducing valve based on a circuit pressure change amount and a position change amount of a pump piston according to the present disclosure.

FIG. 10 is a diagram illustrating an example of a failure detection method 1000 of a pressure reducing valve based on a circuit pressure change amount and a position change amount of a pump piston according to the present disclosure. The failure detection method 1000 of the pressure reducing valve may be performed by at least one processor (e.g. at least one processor of the brake system and/or the ECU of the brake system). As described above, when the processor performs the pressure reducing operation of the brake system, the processor may move the pump piston by controlling the motor of the brake system, and calculate the circuit pressure change amount of the brake system in response to the performing of the pressure reducing operation.

The processor may calculate the target braking pressure of the driver and the circuit pressure of the brake system in response to the performing of the pressure reducing operation, and calculate the pressure error value indicting the difference between the calculated target braking pressure and the circuit pressure. In this case, the processor may judge whether the calculated pressure error value is equal to or more than a first reference (1010). Further, the processor may calculate the circuit pressure change amount of the brake system and the position change amount of the pump piston when the pressure error value is equal to or more than the first reference (S1012). That is, since continuously calculating the circuit pressure change amount and the position change amount of the pump piston may cause deterioration of a computing performance, the processor may calculate the circuit pressure change amount only when the pressure error value is equal to or more than a specific reference.

The processor may determine the pressurization mode of the brake system (S1014). For example, since a different pressure reducing valve is used for each pressurization mode of the brake system, the processor may determine the pressurization mode, and then use the determined pressurization mode for detecting the failure of the pressure reducing valve. According to an exemplary embodiment, the processor may identify whether the determined pressurization mode is the forward pressurization mode (S1016). When the pressurization mode is the forward pressurization mode, the processor may judge whether the circuit pressure change amount is equal to or more than the first threshold value and the position change amount of the pump piston is equal to or more than the fourth threshold value (S1018). When circuit pressure change amount is equal to or more than the first threshold value and the position change amount of the pump piston is equal to or more than the fourth threshold value, the processor may judge that the failure occurs in the first pressure reducing valve (S1022).

When the pressurization mode is the backward pressurization mode other than the forward pressurization mode, the processor may judge whether the circuit pressure change amount is equal to or more than a third threshold value (S1020). When the circuit pressure change amount is equal to or more than the third threshold value, the processor may judge that the failure occurs in a third pressure reducing valve (S1024). That is, since the failure of the third pressure reducing valve is not detected if the position change amount of the pump piston is not changed to a threshold value or more, the position change amount of the pump piston may not be considered in order to detect the failure of the third pressure reducing valve.

When the circuit pressure change amount is less than the third threshold value, the processor may judge whether the absolute value of the circuit pressure change amount is equal to or less than the second threshold value and the position change amount of the pump piston is equal to or more than the fourth threshold value (S1026). When the absolute value of the circuit pressure change amount is equal to or less than the second threshold value and the position change amount of the pump piston is equal to or more than the fourth threshold value, the processor may judge that the failure occurs in the second pressure reducing valve (S1028).

Figure 11:
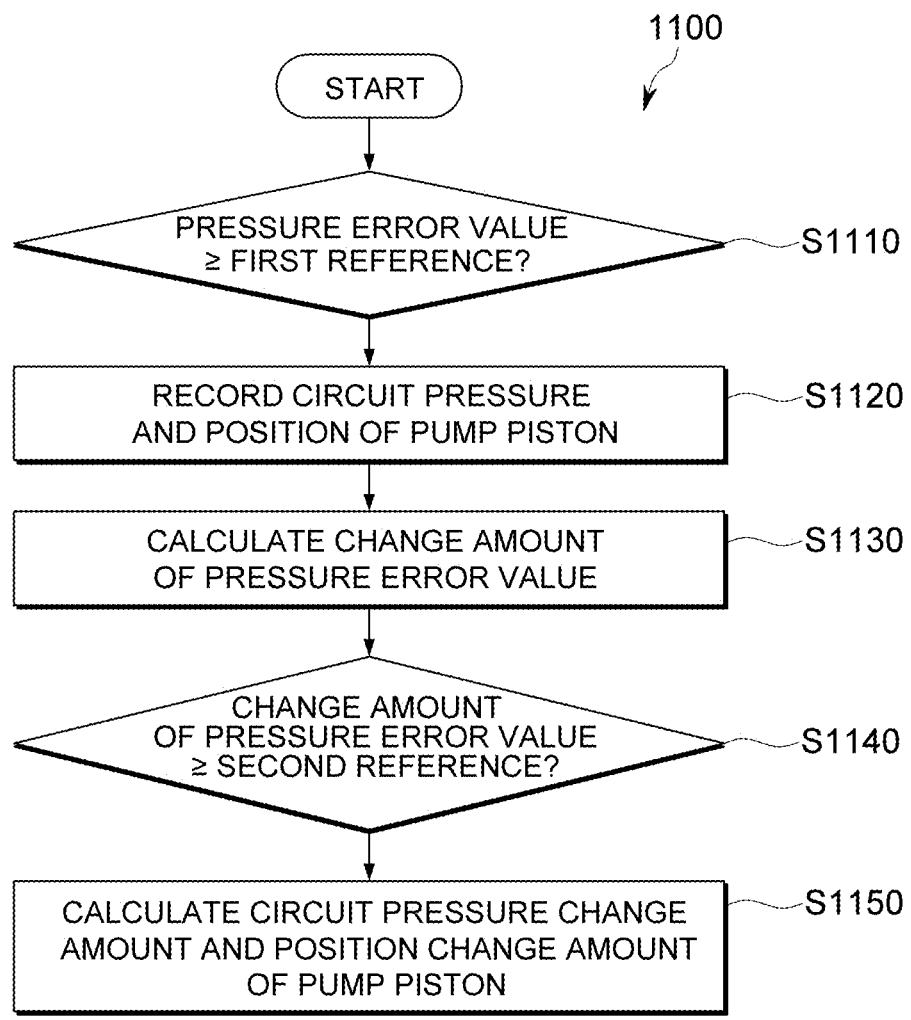
FIG. 11 is a diagram illustrating an example of a method for calculating the circuit pressure change amount depending on a change amount of a pressure error value and the position change amount of the pump piston according to an exemplary embodiment of the present disclosure.

FIG. 11 is a diagram illustrating an example of a method 1100 for calculating the circuit pressure change amount depending on a change amount of a pressure error value and the position change amount of the pump piston according to an exemplary embodiment of the present disclosure. The method 1100 for calculating the circuit pressure change amount and the position change amount of the pump piston may be performed by at least one processor (e.g. at least one processor of the brake system and/or the ECU of the brake system). As described above, when the processor performs the pressure reducing operation of the brake system, the processor may move the pump piston by controlling the motor of the brake system, and calculate the circuit pressure change amount of the brake system and the position change amount of the pump piston in response to the performing of the pressure reducing operation.

The processor may calculate the target braking pressure of the driver and the circuit pressure of the brake system in response to the performing of the pressure reducing operation, and calculate the pressure error value indicting the difference between the calculated target braking pressure and the circuit pressure. In this case, the processor may judge whether the calculate pressure error value is equal to or more than a first reference (1110). In this case, the processor may record the circuit pressure and a position of the pump piston at the first time when the calculated pressure error value is equal to or more than the first reference (1120).

According to an exemplary embodiment, the processor may calculate a change amount of the pressure error value indicting the difference between the target braking pressure and the circuit pressure (S1130). In this case, the processor may judge whether the calculated change amount of pressure error value is equal to or more than a second reference for a predetermined time (1140). When it is judged that the change amount of the pressure error value is equal to or more than the second reference, the processor may calculate the circuit pressure change amount of the brake system and the position change amount of the pump piston based on the recorded circuit pressure and position of the pump piston at the first time (S1150). The calculated circuit pressure change amount and position change amount of the pump piston may be used for detecting the failure of the pressure reducing valve of the brake system.

The method and/or various exemplary embodiments may be implemented by a digital electronic circuit, computer hardware, firmware, software, and/or a combination thereof. Various exemplary embodiments of the present disclosure may be executed by a data processing device, e.g., one or more programmable processors and/or one or more computing devices, or implemented by a computer-readable storage medium or a computer program stored in the computer-readable storage medium. The computer program described above may be written in any form of programming language, including compiled language or interpreted language, and may be distributed in any form of independent executable program, module, and subroutine. The computer program may be distributed through one computing device, a plurality of computing devices that are connected through the same network, and/or a plurality of computing devices distributed to be connected through a plurality of different networks.

The method and/or various exemplary embodiments may be performed by one or more processors configured to operate based on the input data or execute one or more computer programs processing, storing, and/or managing a predetermined function, a predetermined function, etc., by generating the output data. For example, the method and/or various exemplary embodiments of the present disclosure may be performed by a special-purpose logic circuit such as a field programmable gate array (FPGA) or application specific integrated circuit (ASIC), and an apparatus and/or a system for performing the method and/or exemplary embodiments of the present disclosure may be implemented as the special-purpose logic circuit such as the FPGA or ASIC.

One or more processor executing the computing program may include a universal-purpose or special-purpose microprocessor and/or one or more processors of a predetermined type of digital computing device. The processor may receive a command and/or data from each of a read dedicated memory and a random access memory or receive the instruction and/or data from the read dedicated memory and the random access memory. In the present disclosure, components of the computing device performing the method and/or exemplary embodiments may include one or more processors for executing the instructions, and one or more memory devices for storing the instructions and/or data.

According to an exemplary embodiment, the computing device may send and receive data to and from one or more mass storage devices for storing data. For example the computing device may receive data from a magnetic disc or an optical disc and/or transmit data to the magnetic disc or the optical disc. A computer readable storage medium suitable for storing the commands and/or data associated with the computer program may include a predetermined type of non-volatile memory including semiconductor memory devices such as an Erasable Programmable Read-Only Memory (EPROM)), an Electrically Erasable PROM (EEPROM), a flash memory device, etc., but the present disclosure is not limited thereto. For example, the computer readable storage medium may include a magnetic disc such as an internal hard disc or a mobile disc, a magneto-optic disc, a CD-ROM disc, and a DVD-ROM disc.

To provide an interaction with the user, the computing device has a display device (e.g., a cathode ray tube (CRT), a liquid crystal display (LCD), etc.) for providing or displaying information to the user, and a pointing device (e.g., a keyboard, a mouse, a trackball, etc.) for the user to provide an input and/or an instruction on the computing device, but is not limited thereto. That is, the computing device may further arbitrary other types of devices for providing the interaction with the user. For example, for the interaction with the user, the computing device may provide an arbitrary type of sense feedback including a visual feedback, an auditory feedback, and/or a tactile feedback. In this regard, the user may provide the input to the computing device through various gestures such as visuals, voices, and operations.

In the present disclosure, various exemplary embodiments may be implemented in a computing system including a backend component (e.g., a data server), a middleware component (e.g., an application server), and/or a frontend component. In this case, the components may be interconnected by a predetermined form or medium of digital data communications such as a communication network. For example, the communication network may be a (Local Area Network (LAN), a Wide Area Network (WAN), etc.

The computing device based on the exemplary embodiments described in the present specification may be implemented by using hardware and/or software configured to interact with the user, which includes a user device, a user interface (UI) device, a user terminal, or a client device. For example, the computing device may include a hand-held computing device such as a laptop computer. Additionally or alternatively, the computing device may include a Personal Digital Assistants (PDA), a tablet PC, a game console, a wearable device, an Internet of things (IoT) device, a virtual reality (VR) device, an augmented reality (AR) device, etc., but the present disclosure is not limited thereto. The computing device may further include another type of device configured to interact with the user. Further, the computing device may include a hand-held communication device (e.g., a mobile phone, a smart phone, a wireless cellular phone, etc.) suitable for wireless communication through a network such as a mobile communication network, etc. The computing device may be configured to wirelessly communicate with a network server by using wireless communication technologies such as a radio frequency (RF), a microwave frequency (MWF), and an infrared ray frequency (IRF) and/or protocols.

In the present disclosure, various exemplary embodiments including specific structural and functional details are exemplary. Thus, the exemplary embodiments of the present disclosure are not limited to the above and can be implemented in several different forms. In addition, the terms used in the present disclosure are intended to explain some exemplary embodiments and are not interpreted as limiting the exemplary embodiment. For example, a singular word and the above may include a plurality type as long as it is not clearly represented in context.

In the present disclosure, if it is not contrarily defined, all terms used in the present specification including technological or scientific terms have the same meanings as those generally understood by a person with ordinary skill in the art to which such a concept belongs. Further, generally used terms such as terms defined in a dictionary should be interpreted to have a meaning which coincides with a meaning in a context of related art.

In the present specification, the present disclosure is described in relation to some embodiments, but various modifications and changes can be made within the scope without departing from the scope of the present disclosure that can be understood by those skilled in the art in the present disclosure. Further, the modifications and the changes should be regarded to be included in the appended claims of the present specification.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A failure detection method of a pressure reducing valve of a brake system performed by at least one processor, comprising:
   moving, when performing a pressure reducing operation of a brake system, a pump piston in a forward direction or a backward direction by controlling a motor of the brake system;
   calculating a circuit pressure change amount of the brake system in response to the performing of the pressure reducing operation;
   determining a pressurization mode of the brake system based on a moving direction of the pump piston; and
   determining that a failure occurs in at least one of a plurality of pressure reducing valves of the brake system based on the determined pressurization mode and the circuit pressure change amount when the circuit pressure change amount does not correspond to a predetermined range.

2. The failure detection method of a pressure reducing valve of a brake system of claim 1, further comprising:
   wherein the determining of the failure occurring in the pressure reducing valve of the brake system includes determining that the failure occurs in a first pressure reducing valve when the determined pressurization mode is a forward pressurization mode and the circuit pressure change amount is equal to or more than a first threshold value.

3. The failure detection method of a pressure reducing valve of a brake system of claim 1, further comprising:
   wherein the determining of the failure occurring in the pressure reducing valve of the brake system includes determining that the failure occurs in a second pressure reducing valve when the determined pressurization mode is a backward pressurization mode and an absolute value of the circuit pressure change amount is equal to or less than a second threshold value.

4. The failure detection method of a pressure reducing valve of a brake system of claim 1, further comprising:
   wherein the determining of the failure occurring in the pressure reducing valve of the brake system includes determining that the failure occurs in a third pressure reducing valve when the determined pressurization mode is the backward pressurization mode and the circuit pressure change amount is equal to or more than a third threshold value.

5. The failure detection method of a pressure reducing valve of a brake system of claim 1, further comprising:
   calculating a position change amount of the pump piston in response to the performing of the pressure reducing operation,
   wherein the determining of the failure occurring in the pressure reducing valve of the brake system includes determining that a failure occurs in a pressure reducing valve of the brake system when the circuit pressure change amount according to the position change amount of the pump piston does not correspond to a predetermined range.

6. The failure detection method of a pressure reducing valve of a brake system of claim 1, further comprising:
   calculating a target braking pressure of a driver and a circuit pressure of the brake system in response to the performing of the pressure reducing operation; and
   calculating a pressure error value indicating a difference between the calculated target braking pressure and the circuit pressure,
   wherein the calculating of the circuit pressure change amount of the brake system includes calculating the circuit pressure change amount of the brake system when the calculated pressure error value is equal to or more than a first reference.

7. The failure detection method of a pressure reducing valve of a brake system of claim 6, wherein the calculating of the circuit pressure change amount of the brake system when the calculated pressure error value is equal to or more than the first reference includes
recording a circuit pressure at a first time when the calculated pressure error value is equal to or more than the first reference, and
calculating the circuit pressure change amount of the brake system based on the recorded circuit pressure at the first time.

8. The failure detection method of a pressure reducing valve of a brake system of claim 6, further comprising:
calculating a change amount of the pressure error value indicating the difference between the target braking pressure and the circuit pressure,
wherein the calculating of the circuit pressure change amount of the brake system includes
calculating the circuit pressure change amount of the brake system when the calculated pressure error value is equal to or more than the first reference and the calculated change amount of the pressure error value is equal to or more than a second reference for a predetermined time.

9. The failure detection method of a pressure reducing valve of a brake system of claim 1, wherein the pressure reducing valve is a normal close (NC) valve which is opening/closing-controllable.

10. The failure detection method of a pressure reducing valve of a brake system of claim 1, further comprising:
switching the pressurization mode so as not to use a pressure reducing valve in which the failure occurs when it is determined that the failure occurs in the pressure reducing valve of the brake system.

11. The failure detection method of a pressure reducing valve of a brake system of claim 1, wherein the determining of the failure occurring in the pressure reducing valve of the brake system includes
determining that a mechanical stuck occurs in the pressure reducing valve.

12. The failure detection method of a pressure reducing valve of a brake system of claim 1, wherein the moving of the pump piston by controlling the motor of the brake system includes
moving the pump piston in the backward direction when the pressurization mode is the forward pressurization mode, and moving the pump piston in the forward direction when the pressurization mode is the backward pressurization mode.

13. A failure detection method of a pressure reducing valve of a brake system performed by at least one processor, comprising:
determining a pressurization mode of the brake system based on moving direction of a pump piston;
determining a pressure reducing direction of the pump piston performing a pressure reducing operation of the brake system, and calculating a position change amount of the pump piston;
calculating a circuit pressure change amount of the brake system; and
detecting a failure of at least one of a plurality of pressure reducing valves associated with the brake system based on the determined pressurization mode, a pressure reducing direction of the pump piston, position change amount of the pump piston, and the circuit pressure change amount.

14. The failure detection method of a pressure reducing valve of a brake system of claim 13, wherein the detecting of the failure of one of the first pressure reducing valve, the second pressure reducing valve, and the third pressure reducing valve associated with the brake system includes
detecting the failure of the first pressure reducing valve when the determined pressurization mode is a forward pressurization mode, a pressure reducing direction of the pump piston is a backward direction, a position change amount of the pump piston is equal to or more than a predetermined reference, and the circuit pressure change amount is equal to or more than a first threshold value.

15. The failure detection method of a pressure reducing valve of a brake system of claim 13, wherein the detecting of the failure of one of the first pressure reducing valve, the second pressure reducing valve, and the third pressure reducing valve associated with the brake system includes
detecting the failure of the second pressure reducing valve when the determined pressurization mode is a backward pressurization mode, the pressure reducing direction of the pump piston is a forward direction, the position change amount of the pump piston is equal to or more than the predetermined reference, and an absolute value of the circuit pressure change amount is equal to or less than a second threshold value.

16. The failure detection method of a pressure reducing valve of a brake system of claim 13, wherein the detecting of the failure of one of the first pressure reducing valve, the second pressure reducing valve, and the third pressure reducing valve associated with the brake system includes
detecting, the failure of the third pressure reducing valve when the determined pressurization mode is the backward pressurization mode, the pressure reducing direction of the pump piston is the forward direction, and the circuit pressure change amount is equal to or more than a third threshold value.

17. A brake system comprising:
a chamber storing a brake liquid;
a pump piston formed to advance and retreat in a forward direction or a backward direction inside the chamber in order to generate a braking pressure;
a motor connected to the pump piston, and formed to generate a power for an operation of the pump piston;
a first pressure reducing valve, a second pressure reducing valve, and a third pressure reducing valve connected to the chamber, and forming a flow path of the brake liquid stored in the chamber through opening/closing; and
a controller managing the braking pressure by moving the pump piston through driving of the motor, and calculating a circuit pressure change amount of the brake system and determining a pressurization mode of the brake system based on a moving direction of a pump piston to detect failures of the first pressure reducing valve, the second pressure reducing valve, and the third pressure reducing valve.

18. The brake system of claim 17, wherein the controller determines that the failure occurs in the first pressure reducing valve when a pressurization mode of the brake system is a forward pressurization mode and the circuit pressure change amount is equal to or more than a first threshold value.

19. The brake system of claim 17, wherein the controller determines that the failure occurs in the second pressure reducing valve when the pressurization mode of the brake system is a backward pressurization mode and an absolute value of the circuit pressure change amount is equal to or less than a second threshold value.

20. The brake system of claim 17, wherein the controller determines that the failure occurs in the third pressure reducing valve when the pressurization mode of the brake system is the backward pressurization mode and the circuit pressure change amount is equal to or more than a third threshold value.

* * * * *